(12) United States Patent
Kawano et al.

(10) Patent No.: US 6,751,018 B2
(45) Date of Patent: Jun. 15, 2004

(54) TOTAL INTERNAL REFLECTION FLUORESCENCE MICROSCOPE HAVING A CONVENTIONAL WHITE-LIGHT SOURCE

(75) Inventors: Yoshiro Kawano, Tokyo (JP); Chikara Abe, Hicksville, NY (US); Katsuyuki Abe, Tokyo (JP); Keisuke Tamura, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/410,703

(22) Filed: Apr. 10, 2003

(65) Prior Publication Data

US 2003/0231385 A1 Dec. 18, 2003

Related U.S. Application Data

(63) Continuation of application No. 09/769,072, filed on Jan. 25, 2001, now Pat. No. 6,597,499.

(51) Int. Cl.[7] .............................................. G02B 21/06
(52) U.S. Cl. ..................... 359/387; 359/381; 250/458.1
(58) Field of Search ................................ 359/368, 381, 359/385, 387, 388, 389; 250/458.1, 459.1, 461.1

(56) References Cited

U.S. PATENT DOCUMENTS

| | | | | |
|---|---|---|---|---|
| 2002/0076729 A1 | * | 6/2002 | Meyer et al. | ................ 435/7.2 |
| 2003/0086163 A1 | * | 5/2003 | Aono et al. | ................ 359/388 |
| 2003/0184854 A1 | * | 10/2003 | Kamimura et al. | ......... 359/368 |

* cited by examiner

*Primary Examiner*—Mark A. Robinson
(74) *Attorney, Agent, or Firm*—Scully, Scott, Murphy & Presser (57) ABSTRACT

A microscope for use in total internal reflection fluorescence microscopy (TIRFM) is provided. The microscope includes a first white-light source for directing light along a first optical path; an annular slit member disposed in the first optical path, the annular slit member having an annular slit for blocking all but an annulus of light corresponding to the annular slit; and an objective lens for directing the annulus of light to a specimen such that TIRFM of the specimen is achieved. Also provided are various ways for converting the microscope to and from a TIRFM microscope and a conventional microscope.

10 Claims, 11 Drawing Sheets

Drawing for the Inverted Microscope.
The Objective Lens and Specimen.

TOTAL INTERNAL REFLECTION FLUORESCENCE MICROSCOPE HAVING A CONVENTIONAL WHITE-LIGHT SOURCE

CROSS REFERENCE TO RELATED APPLICATIONS

This application is a continuation of U.S. application Ser. No. 09/769,072, filed on Jan. 25, 2001 now U.S. Pat. No. 6,597,499, the entire contents of which is incorporated herein by its reference.

BACKGROUND OF THE INVENTION

1. Field of the Invention

The present invention relates generally to total internal reflection fluorescence microscopy (TIRFM) and, more particularly, to total internal reflection fluorescence microscopes which use conventional white-light sources which can also be used as a conventional microscope.

2. Prior Art

Figure 1:
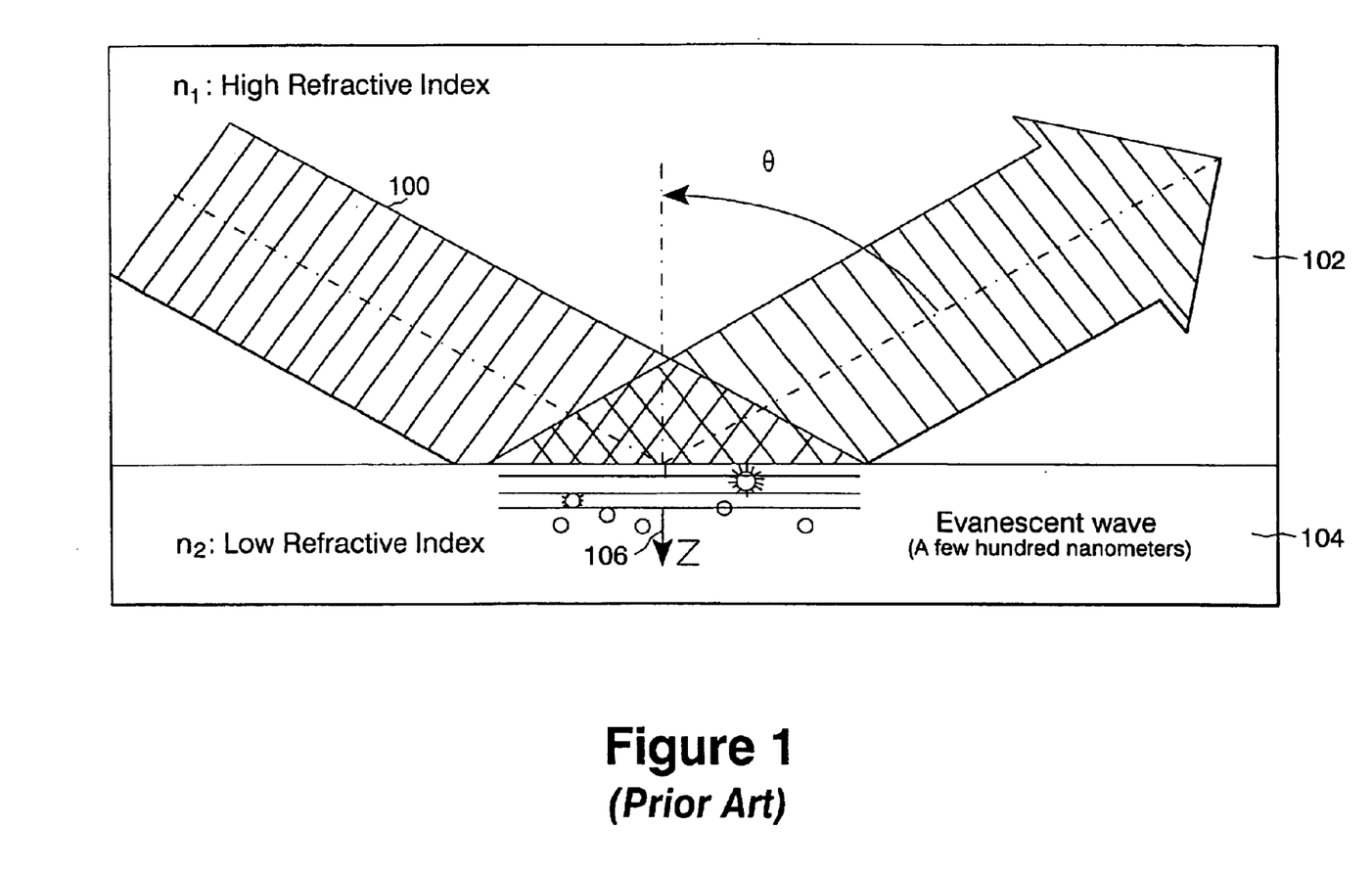
FIG. 1 illustrates a schematic drawing of the wavefronts of a laser beam incident on an interface between two materials.

Total internal reflection is an optical phenomenon. When light strikes the interface between two optical media of different refractive indices, the light incident at an angle greater than the "critical angle" undergoes "total reflection". However, beyond the angle of total reflection, the electromagnetic field of the incoming/reflected light extends into the Z-direction as can be seen from FIG. 1. FIG. 1 illustrates a laser 100 incident on an interface between two materials 102, 104 having refractive indices $n_1$ and $n_2$ respectively. The laser 100 is reflected at the interface while a wave 106 extends into the z-direction. The strength of the field in the z-direction is termed an "evanescent wave" 106 which decreases exponentially and its effects extend only a few hundred nano-meters into the second medium 104.

That portion of a specimen within the evanescent field can be excited to emit fluorescence and consequently can be seen or recorded. This is the essence of TIRFM. TIRFM is an optical technique used to observe single molecule fluorescence which has been used for many years by biophysicists. TIRFM is also gaining popularity with cell biologist and nueroscientists to observe membrane fluorescence, in part because of the development of membrane specific dyes.

The condition for total reflection is:

$$\theta \geq \sin^{-1}(n_2/n_1) \quad (1)$$

where $\theta$ is the angle of incidence of the light, $n_1$ is the refractive index of the first optical medium, $n_2$ is the refractive index of the second optical medium, and $n_2 > n_1$.

The condition of equation 1 is identical to that of creating an evanescent wave. The key advantage of TIRFM is the shallow penetration depth of the evanescent wave. Only fluorophore molecules very near the surface of a specimen are excited to emit, creating a super thin optical section. Outside of the evanescent field, fluorescence is minimal which leads to images of very high contrast.

Figure 2:
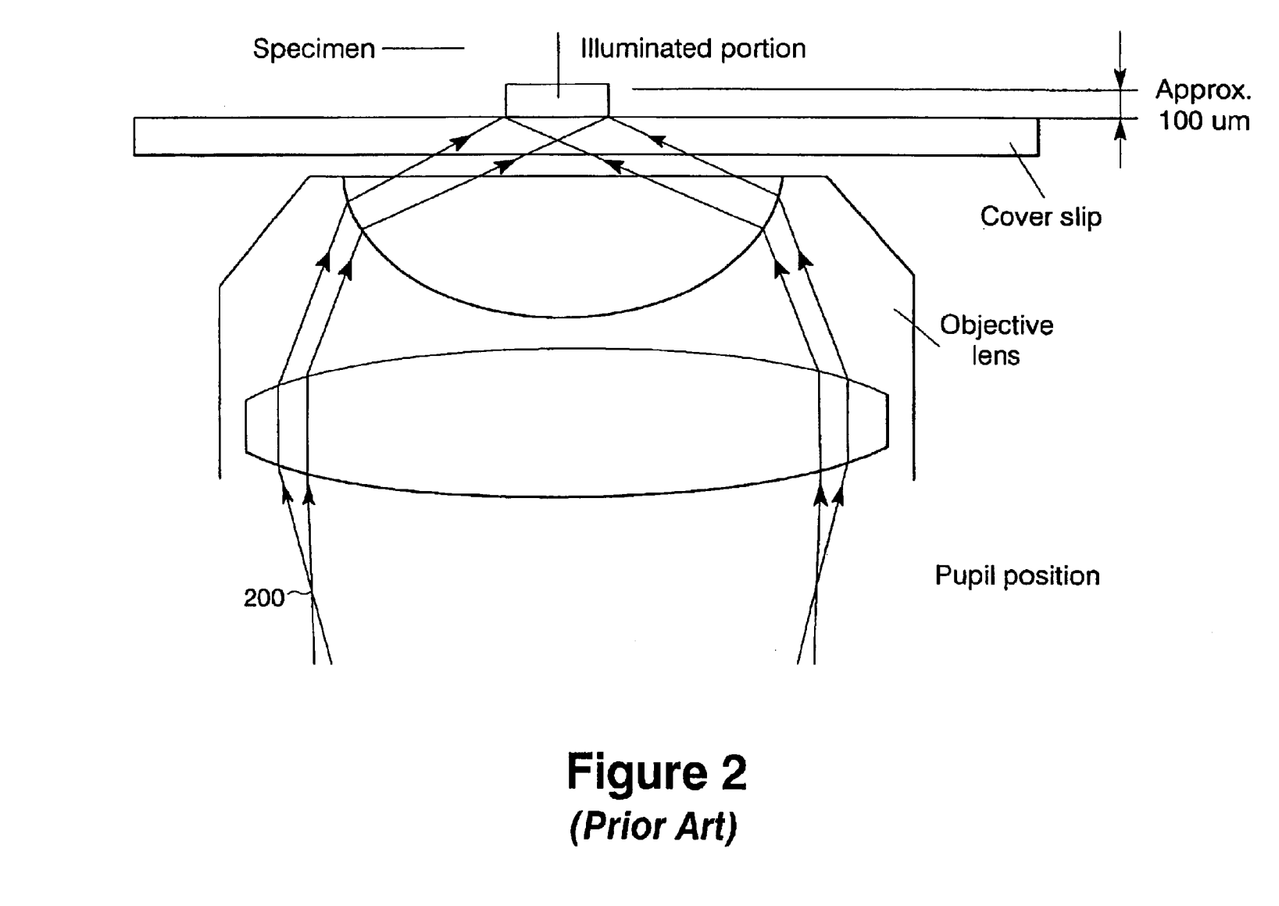
FIG. 2 illustrates a schematic drawing of a conventional TIRFM microscope having a laser light source.

To create the condition to total reflection of equation 1, a TIRFM microscope having a laser light source directs laser light 200 at a specimen at the angle θ needed for total reflection as shown in FIG. 2. Conventional white-light sources used in conventional microscopes (other than TIRFM microscopes) such as mercury, halogen, xenon, and metal halide lamps have not been used in TIRFM microscopes because they do not illuminate the angle_or higher needed for totally reflected illumination. Therefore, expensive microscopes are needed having laser light sources which are dedicated to TIRFM. Furthermore, the laser light sources generally have a limited wavelength and narrow bandwidth.

SUMMARY OF THE INVENTION

Therefore it is an object of the present invention to provide a microscope capable of TIRFM with conventional white-light sources.

It is a further object of the present invention to provide a microscope capable of both TIRFM and conventional microscopy with conventional white-light sources.

It is yet a further object of the present invention to provide a microscope capable of TIRFM having a conventional white-light source which is inexpensive as compared to conventional TIRFM microscopes employing a laser light source.

It is still yet a further object of the present invention to provide a microscope capable of TIRFM which can operate over a wider wavelength bandwidth than conventional TIRFM microscopes employing laser light sources.

Accordingly, a microscope is provided. The microscope comprises: a first optical path having; a white-light source, an illumination optical system, and an excitation filter disposed in said illumination optical system; and an observation optical path having; an objective lens, an emission filter, a dichromatic mirror disposed on a cross point of said first optical path and said observation optical path; and an annular slit member disposed in said illumination optical system.

Also provided is a microscope for use in total internal reflection fluorescence microscopy (TIRFM). The microscope comprises: a first white-light source for directing light along a first optical path; an annular slit member disposed in the first optical path, the annular slit member having an annular slit for blocking all but an annulus of light corresponding to the annular slit; and an objective lens for directing the annulus of light to a specimen such that TIRFM of the specimen is achieved.

Preferably, the microscope further comprises converting means for converting the microscope to and from a conventional microscope. The converting means preferably comprises one of:

(1) a mechanism upon which the annular slit member is disposed, the mechanism for moving the annular slit member into and out from the first optical path;

(2) a second white-light source for directing light along a second optical path; a blocking means disposed in each of the first and second optical paths for selectively blocking light from either the first or second optical paths; and a beam splitter disposed at the convergence of the first and second optical paths to transmit one of the annulus of light from the first optical path or the light from the second optical path to the objective lens; or (3) a turret having at least two stations, each station being capable of being selectively disposed in the first optical path and having a means to direct light from the first optical path to the objective lens, one of the stations further having a diffuser for diffusing the annulus of light.

Further provided is a combined total internal reflection fluorescence microscopy (TIRFM) and conventional microscope. The combined microscope comprises: a first white-light source for directing light along a first optical path; an annular slit member disposed in the first optical path, the annular slit member having an annular slit for blocking all but an annulus of light corresponding to the annular slit; an objective lens for directing the annulus of light to a specimen such that TIRFM of the specimen is achieved; and converting means for converting the microscope to and from a TIRFM microscope and a conventional microscope.

The microscope/combined microscope are preferably configured with either an upright set-up configuration or an inverted set-up configuration.

Still further provided is an annular slit member for use in a microscope to permit total internal reflection fluorescence microscopy (TIRFM). The annular slit member has an annular slit for blocking all but an annulus of light corresponding to the annular slit. The annular slit member preferably further comprises a mechanism for housing the annular slit member for selective movement thereof between a first position in the optical path of a white-light source and a second position removed from the first optical path.

Still yet further provided is a method for converting a conventional microscope into a total internal reflection fluorescence microscopy (TIRFM) microscope. The method comprises the steps of: providing a conventional microscope; and disposing an annular slit member in an optical path of the microscope between a white-light source and an objective lens, the annular slit member having an annular slit for blocking all but an annulus of light corresponding to the annular slit.

The disposing step preferably comprises either:

(1) fixing the annular slit member to the microscope in the optical path; or (2) fixing the annular slit member to a mechanism which is movably fixed to the microscope for selective movement between a first position where the annular slit member is in the first optical path and a second position where the annular slit member is removed from the first optical path.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of microscopes, it has been found particularly useful in the environment of upright microscopes wherein the objective lens is above the specimen. However, the present invention is also useful in microscopes having an inverted set-up where the objective lens is below the specimen. Therefore, without limiting the applicability of the invention to any particular microscope configuration, the invention will be described in the environment of upright microscopes.

Figure 3:
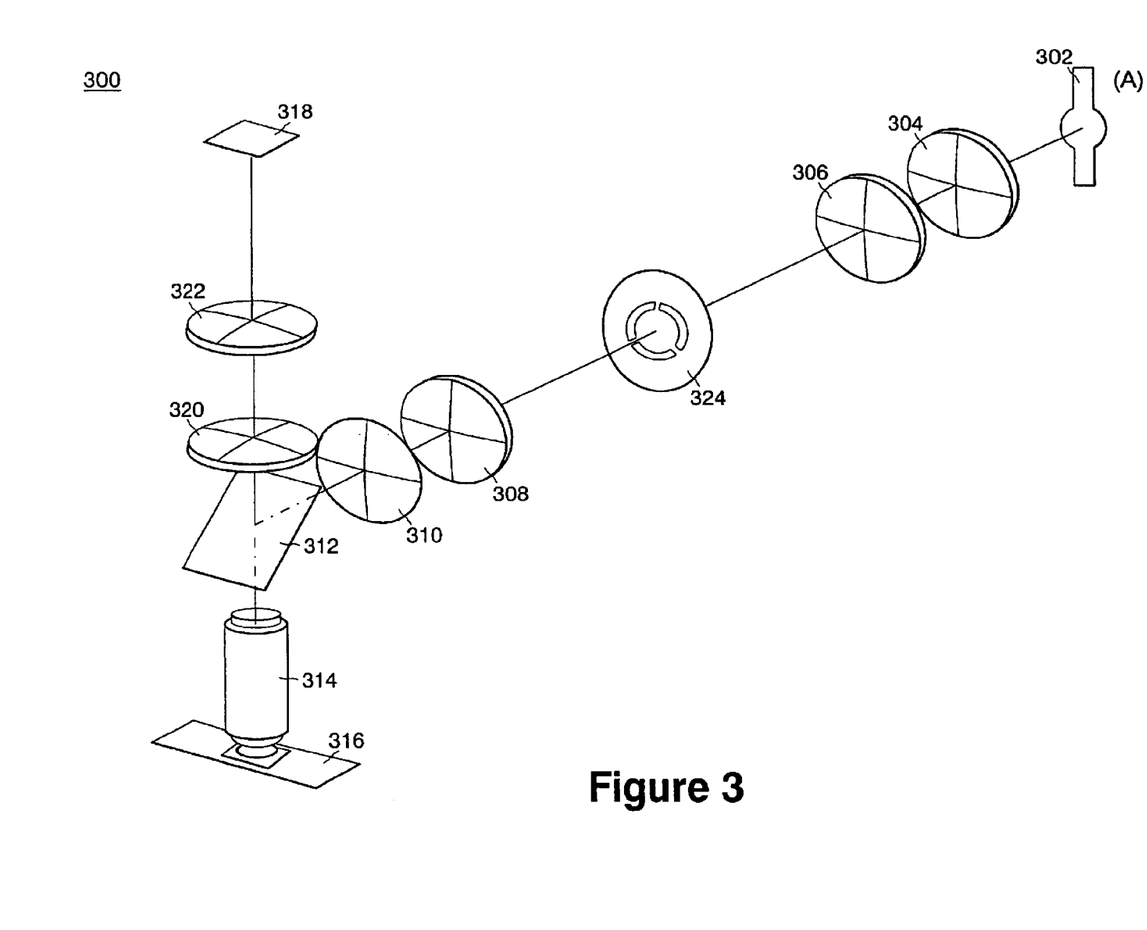
FIG. 3 illustrates a schematic drawing of a TIRFM microscope of the present invention having an annular slit member.

Referring now to FIG. 3, there is shown a first embodiment of a microscope for use in total internal reflection fluorescence microscopy (TIRFM), the microscope being generally referred to by reference numeral 300. Along a first optical path (A), there is disposed a conventional light source 302, alternatively referred to as a white-light source. By "white-light" source it is meant light sources commonly used in microscopes other than lasers, such as halogen, mercury, xenon, and metal halide lamps. These lamp types are given by way of example only and not as an exhaustive listing thereof. Those of skill in the art will realize that "white-light" source contemplates any conventional light source used in the microscope arts with the exception of a laser light source.

The first optical path contains those elements which are considered known and conventional in the microscope arts, such as a corrector lens 304, illuminator lens 306, projection lens 308, and excitation filter 310, the function of which are well known in the art. Light from the first light source 302 and the elements discussed above is incident upon a dichromatic mirror 312 or similar device which reflects the light to an objective lens 314 and specimen holder 316 which holds the specimen to be viewed, thereby illuminating the specimen. The specimen then can be projected though the dichromatic mirror 312 along another optical path to an imaging device 318 such as a CCD or an eyepiece (not shown). The second optical path typically will also have additional elements, such as an emission filter 320 and tube lens 322, the function of which are well known in the microscope arts.

Referring still to FIG. 3, by way of illustration only an not to limit the scope or spirit of the present invention, microscope 300 preferably has the following specifications:

The numerical aperture of the objective lens 314 [NA (OB)]=1.45;

The magnification for the objective lens is 60 times;

The refractive index (n1) of an immersion oil for the objective lens=1.515;

The refractive index for water (n2) in the specimen=1.33;

The focal length for the objective lens f(OB)=3 mm;

Magnification=100 times; and

The magnification by the illumination lens that is from "the pupil of the objective lens" to "the conjugate position into the illuminator", B(IL)=0.561.

Figure 4:
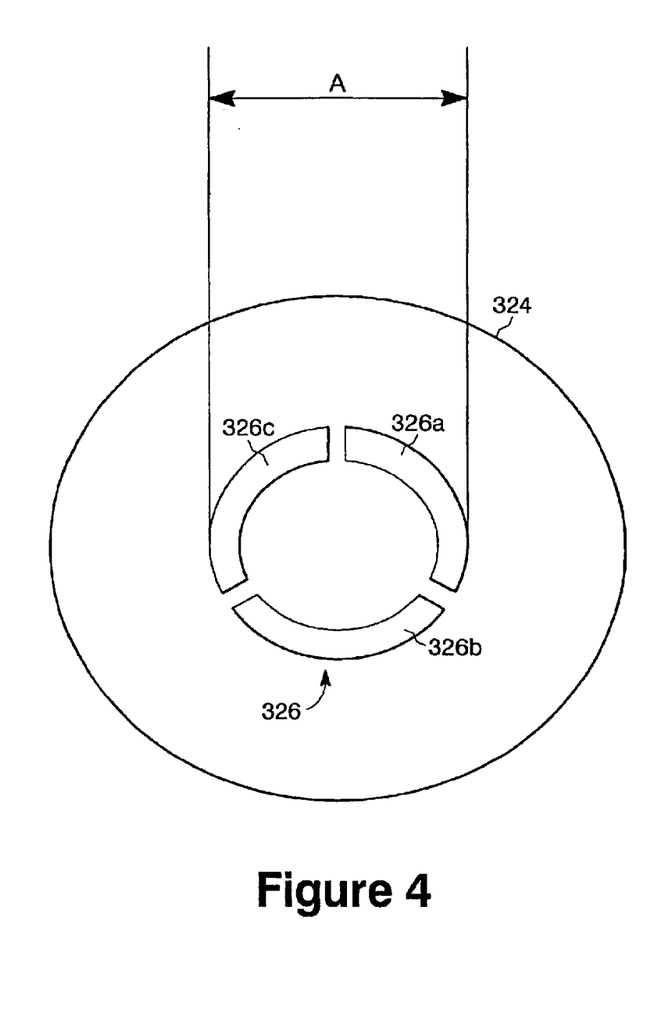
FIG. 4 illustrates the annular slit member of FIG. 3.

The description thus far of the microscope 300 of FIG. 3 is similar to microscopes known in the art and can be used conventionally. By a conventional microscope or conventional use of a microscope, it is meant a microscope which uses a conventional light source to illuminate a specimen. However, microscope 300 further includes an annular slit member 324 disposed in the first optical path (A). Referring now to FIG. 4, the annular slit member 324 has an annular slit 326 for blocking all but an annulus of light corresponding to the annular slit 326. For ease of fabrication, the annular slit 326 comprises three separate slits 326a, 326b, and 326c. Furthermore, the annular slit member 324 is shown as circular by way of example only, and not to limit the scope of the invention in any way.

Figure 5:
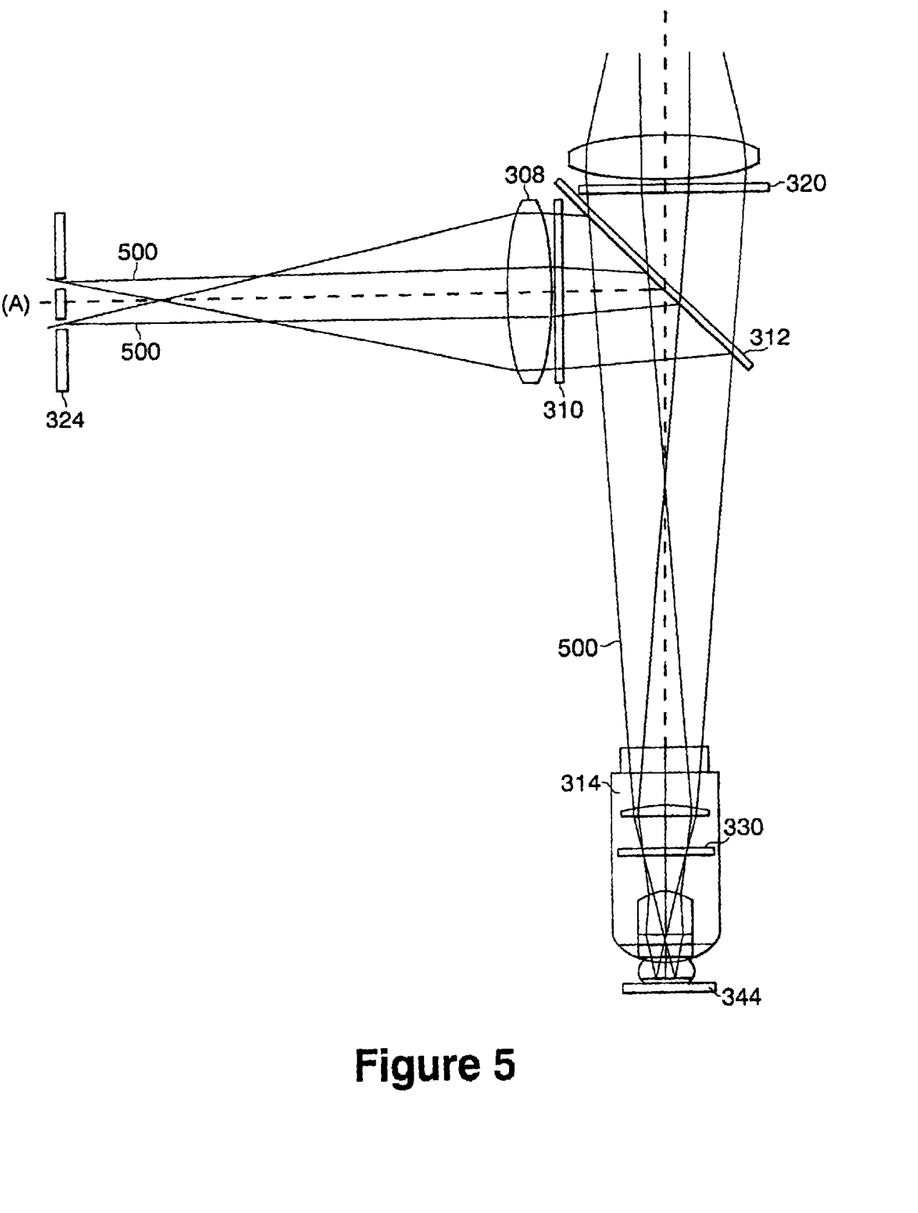
FIG. 5 illustrates a schematic drawing of an optical path from the annular slit member to an objective lens of the TIRFM microscope of the present invention.

Referring now to FIG. 5, there is shown a schematic illustration of a portion of the microscope 300 of FIG. 3 in greater detail. Light from the light source 302 (not shown in FIG. 5) is blocked by the annular slit member 324 except for an annulus of light 500 corresponding to the annular slit 326. The annulus of light 500 is then projected onto the dichromatic mirror 312 by the projection lens 308. The dichromatic mirror directs the annulus of light 500 to the objective lens 314 which illuminates a specimen (not shown) such that TIRFM of the specimen is achieved. The annulus slit image is projected to the back focal plain 330 for the objective lens. This illumination light illuminates a specimen (not shown) and excite molecules. TIRFM is achieved because the condition of equation 1, illustrated in FIG. 1, is possible with the annulus of light 500 replacing the laser 100.

Figure 5A:
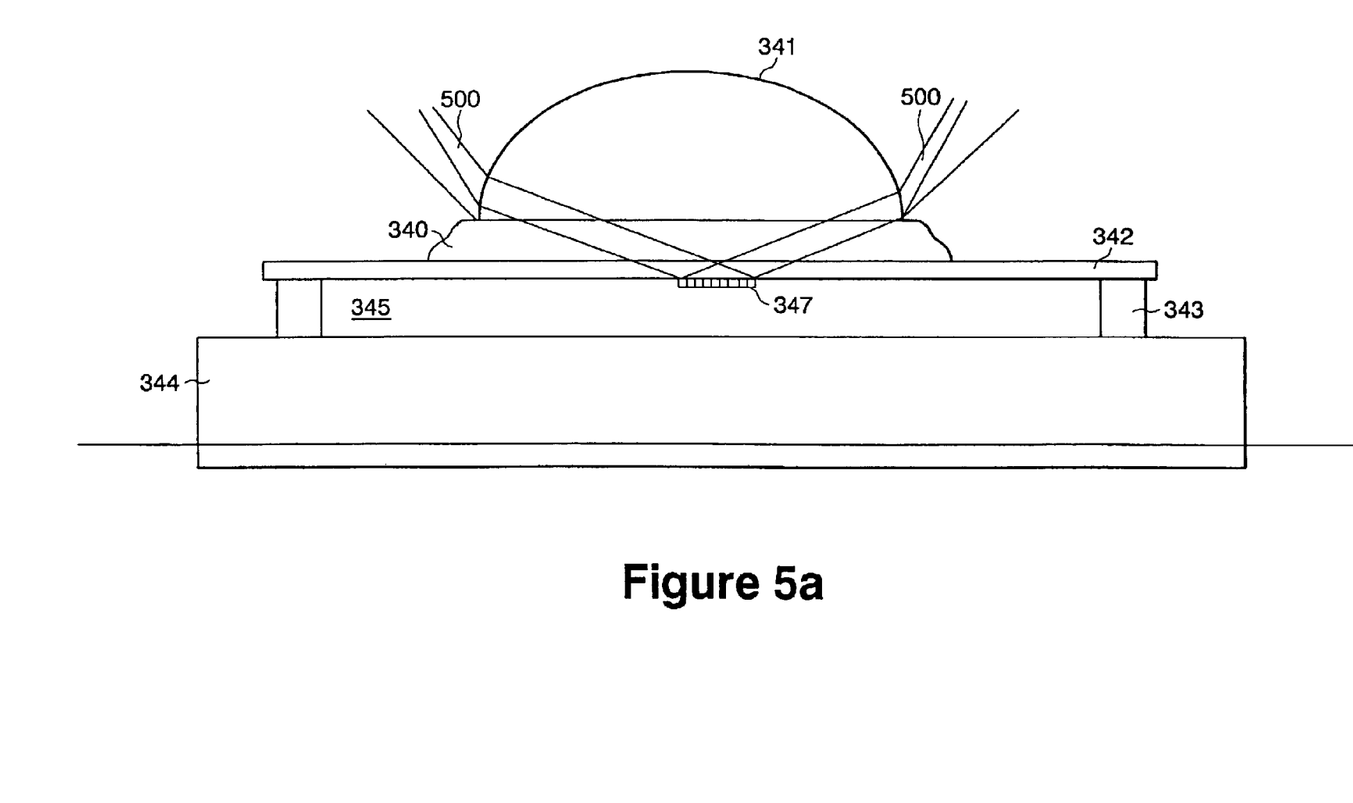
FIG. 5a illustrates the objective lens and specimen of the microscope of FIG. 3.

Referring now to FIG. 5a, there is shown the objective lens and specimen of the upright microscope of FIG. 3. The top lens 341 for the objective lens 314 is shown sitting on an immersion liquid 340 (preferably an immersion oil). A specimen 345 having a refractive index n2 is sandwiched between the cover glass 342 and a slide glass 344 and spaced apart by a spacer 343. Light 500 comes from the illuminator, is incident and passes through the immersion liquid 340. The light reflects between the cover glass 342 and specimen 345. The refractive index of the cover glass 342 is preferably almost the same as the refractive index of the immersion liquid 340 (n1). An evanescent wave 347 is then produced from the surface of the cover glass 342. Excitation light strikes the molecules 345 that are very close to the cover glass 342 therefore achieving fluorescence. The emission light from the molecules go through the dichromatic filter 312 (FIG. 3) and emission filter 320 (FIGS. 3 and 5) and are focused on the imaging device 318 (FIG. 3).

Figure 6:
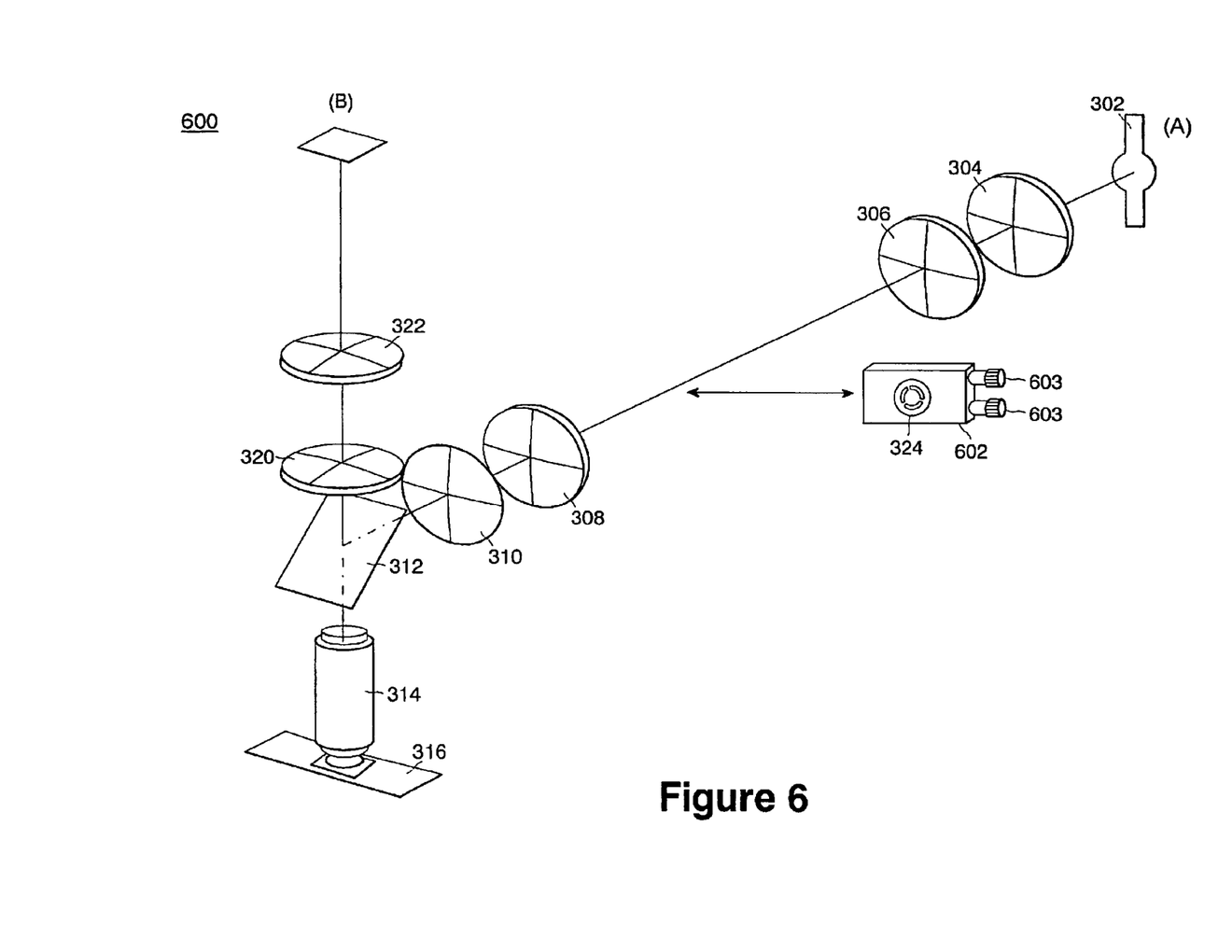
FIG. 6 illustrates an alternative embodiment of the microscope of FIG. 3 wherein the annular slit member is movable into and out from an optical path such that the microscope can be used either conventionally or for TIRFM.

Referring now to FIG. 6, there is illustrated a first variation of the microscope 300 of FIG. 3 having means for converting the microscope 300 from a TIRFM microscope to a conventional microscope and vice versa. The microscope of FIG. 6 being generally referred to by reference numeral 600. Microscope 600 has a slide mechanism 602 upon which the annular slit member 324 is mounted. The slide mechanism 602 slides the annular slit member 324 into and out from the first optical path (A). The slide mechanism 602 has a mechanism for aligning the annular slit member 324 by adjustment of knobs 603. When the annular slit member 324 is slid into a position as shown in FIG. 6, that is, out from the first optical path (A), the microscope 600 can be operated conventionally. However, when the annular slit member 324 is slid into a position in the first optical path (A), the microscope 600 operates as does the microscope of FIG. 3, that is as a TIRFM microscope. Slide mechanisms of the type which slid an optical element into and out from an optical path are well known in the art of optics and microscopes and therefore a detailed description thereof is omitted here for the sake of brevity.

Referring still to FIG. 6, by way of illustration only an not to limit the scope or spirit of the present invention, microscope 600 preferably has the following specifications:

The numerical aperture NA(OB) of the objective lens 314=1.65;

The refractive index (n1) of the immersion liquid for the objective lens=1.78;

The refractive index (n2) for water in the specimen=1.33;

This is a focal length for the objective lens f(OB)=1.8 mm;

Magnification 100 times; and

The magnification by the illumination lens that is from "the pupil of the objective lens" to "the conjugate position into the illuminator" B(IL)=0.84.

Figure 7:
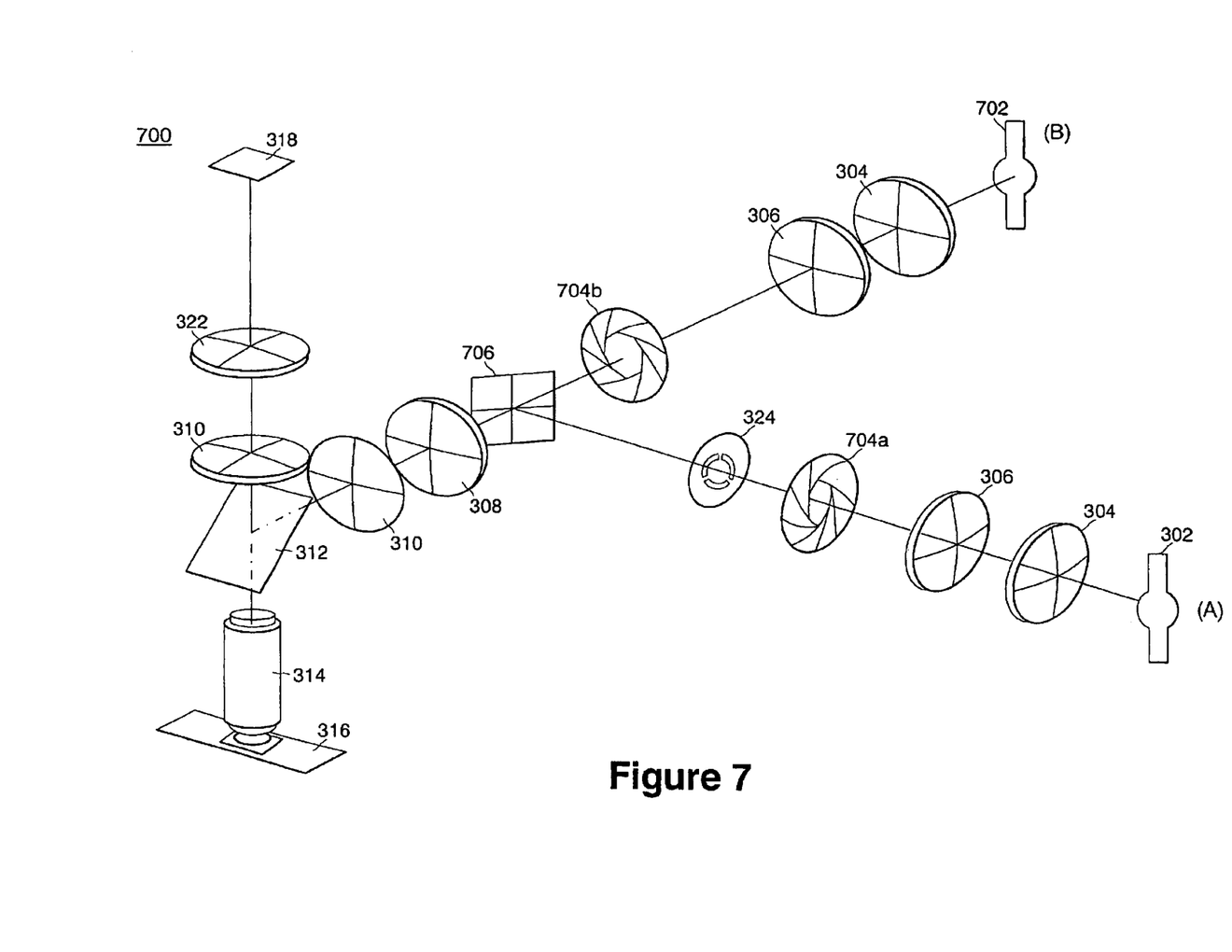
FIG. 7 illustrates another alternative embodiment of the microscope of FIG. 3, wherein first and second light sources are used, each having its own optical path wherein one of the optical paths has the annular slit member of FIG. 3 such that the microscope can be used either conventionally or for TIRFM.

Referring now to FIG. 7, there is illustrated a second variation of the microscope 300 of FIG. 3 having means for converting the microscope 300 from a TIRFM microscope to a conventional microscope and vice versa. The microscope of FIG. 7 being generally referred to by reference numeral 700. Microscope 700 includes a second white-light source 702 for directing light along a second optical path (B). A blocking means, such as a shutter 704a, 704b which can be manually or automatically operated, is disposed in each of the first and second optical paths for selectively blocking light from either the first or second white-light sources 302, 702, respectively. Microscope 700 further has a beam splitter 706 disposed at the convergence of the first and second optical paths to transmit one of the annulus of light from the first optical path having the annular slit member 324 or the light from the second optical path to the objective lens 314. When shutter 704a is closed thereby blocking the annulus of light from the annular slit member 324 from the objective lens 314, the microscope 700 can be operated conventionally. However, when the shutter 704b is closed thereby blocking light from the second white-light source and allowing the annulus of light from the annular slit member 324 to reach the objective lens 314, the microscope operates as does the microscope of FIG. 3, that is as a TIRFM microscope.

Referring still to FIG. 7, by way of illustration only an not to limit the scope or spirit of the present invention, microscope 700 preferably has the following specifications:

The numerical aperture NA(OB) of the objective lens 314=1.65;

The refractive index (n1) of the immersion liquid for the objective lens=1.78;

The refractive index (n2) for water in the specimen=1.33;

The focal length for the objective lens f(OB)=1.8 mm;

Magnification 100 times; and

The magnification by the illumination lens that is from "the pupil of the objective lens" to "the conjugate position into the illuminator" B(IL)=0.84.

Figure 8:
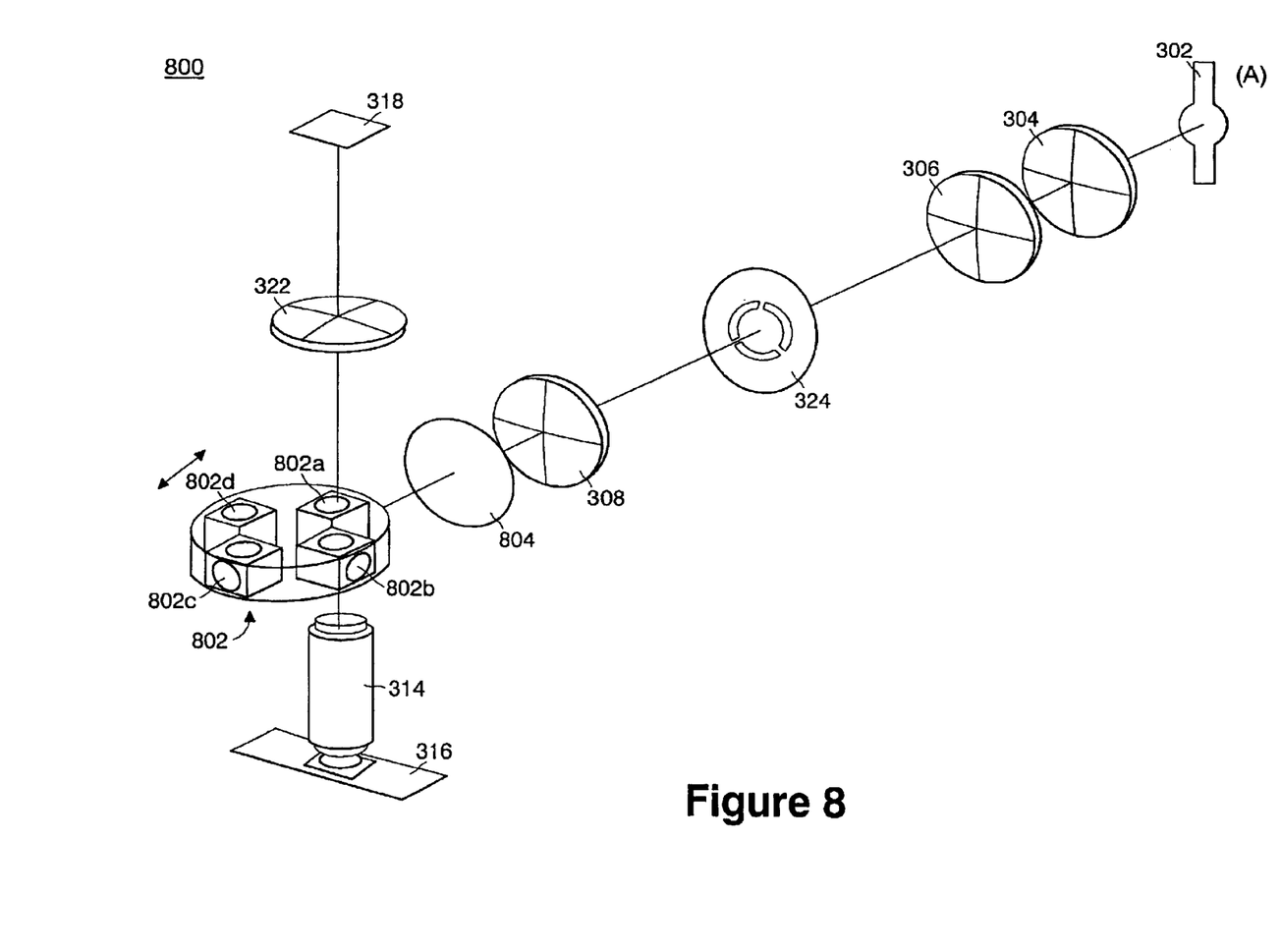
FIG. 8 illustrates yet another alternative embodiment of the microscope of FIG. 3, wherein a turret is used to choose between a conventional microscope and a TIRFM microscope.

Referring now to FIG. 8, there is illustrated a third variation of the microscope 300 of FIG. 3 having means for converting the microscope 300 from a TIRFM microscope to a conventional microscope and vice versa. The microscope of FIG. 8 being generally referred to by reference numeral 800. Microscope 800 includes a rotatable turret 802 having at least two stations, and preferably four stations as is shown in FIG. 8. As is known in the art, each station on the turret 802 is capable of being selectively disposed in the first optical path (A). Each station also has a means to direct light from the first optical path to the objective lens 314, such as a dichromatic mirror 312 (not shown in FIG. 8). The dichromatic mirror 312 is preferably in a cube units 802a, 802b, 802c, and 802d which comprise the rotatable turret 802.

At least one of the stations 802a also has a diffuser 804 for diffusing the annulus of light from the annular slit member 324. Although the diffuser 804 is shown as an element in the first optical path, it is shown as such for simplification purposes, those skilled in the art will understand that it is fixed to station 802a and rotates therewith. When the turret 802 is rotated such that station 802a is in the optical path (A) thereby diffusing the annulus of light from the annular slit member 324, the microscope 700 can be operated conventionally. However, when the turret 802 is rotated such that a station not having a diffuser 804 is in the first optical path (A) thereby allowing the annulus of light from the annular slit member 324 to reach the objective lens 314, the microscope operates as does the microscope of FIG. 3, that is as a TIRFM microscope. For example, diffuser 804 is provided in cube unit 802a, and the diffuser 804 is not provided in cube unit 802b. When the turret 802 rotates to the cube unit 802b the configuration is TIRFM. When the turret 802 rotates to the cube unit 802a the configuration is fluorescence microscope.

Thus, when the diffuser is provided in the turret 802, the microscope can easily change to TIRFM and fluorescence microscope.

Figure 9:
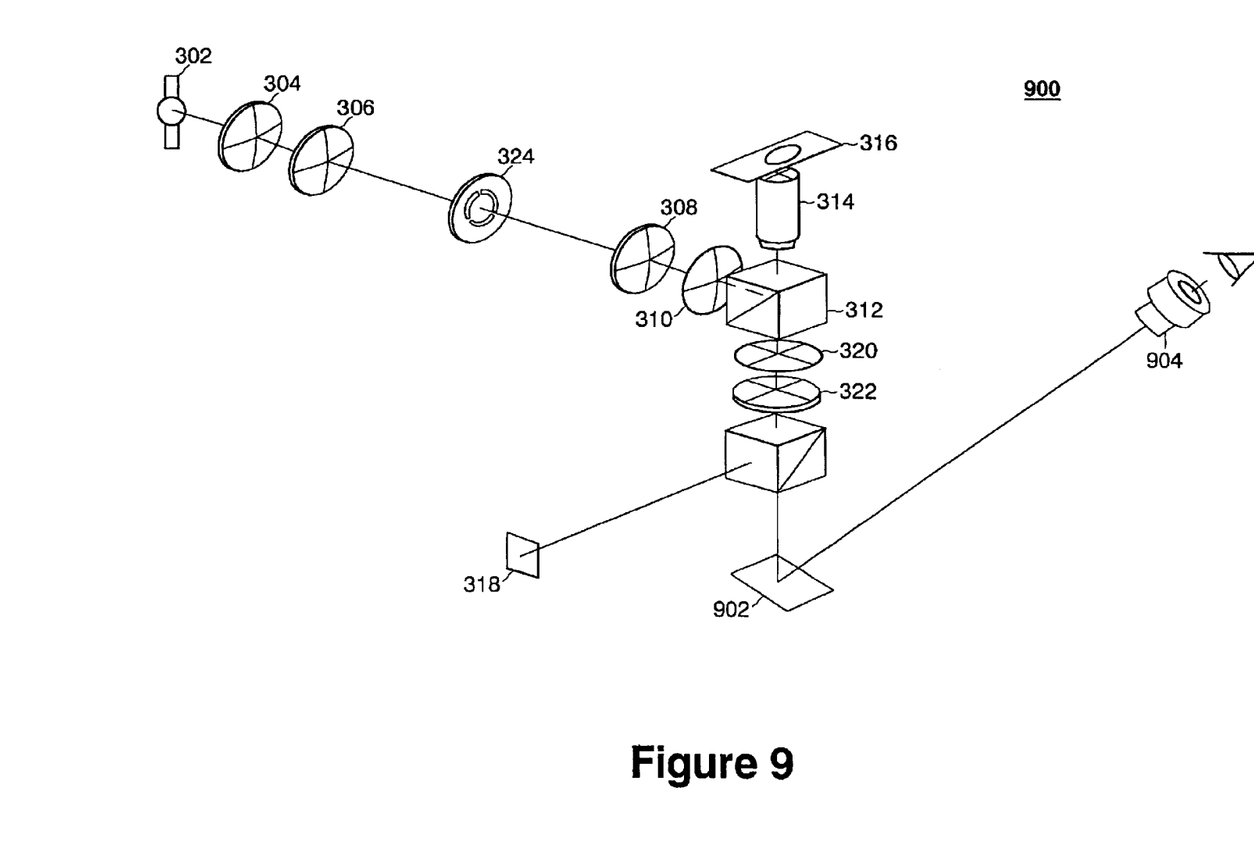
FIG. 9 illustrates the microscope of FIG. 3 having an inverted setup wherein the objective lens is below the sample to be observed.

Referring now to FIG. 9 in which like numeral represent like elements, there is shown an alternative microscope of the present invention, generally referred to by reference numeral 900. The microscope 900 of FIG. 9 differ from that shown in FIG. 3 in that it is configured in an inverted set-up instead of an upright set-up. That is, the objective lens is disposed below the specimen to be observed, whereas, the objective lens is disposed above the specimen to be observed in an upright set-up configured microscope. The microscope 900 of FIG. 9 additionally has a mirror 902 for reflecting the image of the specimen to an eyepiece 904 as well as an imaging device 318. Those skilled in the art will realize that any of the configurations described above, although shown in an upright set-up configuration are equally applicable in an inverted setup configuration. In fact, those of skill in the art will also realize that the microscope of the present invention is not limited to any particular configuration or configurations.

Referring still to FIG. 9, by way of illustration only an not to limit the scope or spirit of the present invention, microscope 900 preferably has the following specifications:

The numerical aperture NA(OB) of the objective lens 314=1.65;

The refractive index (n1) of the immersion liquid for the objective lens=1.78;

The refractive index (n2) for water in the specimen=1.33;

The focal length for the objective lens f(OB)=1.8 mm;

Magnification 100 times; and

The magnification by the illumination lens that is from "the pupil of the objective lens" to "the conjugate position into the illuminator" B(IL)=0.4.

Figure 10:
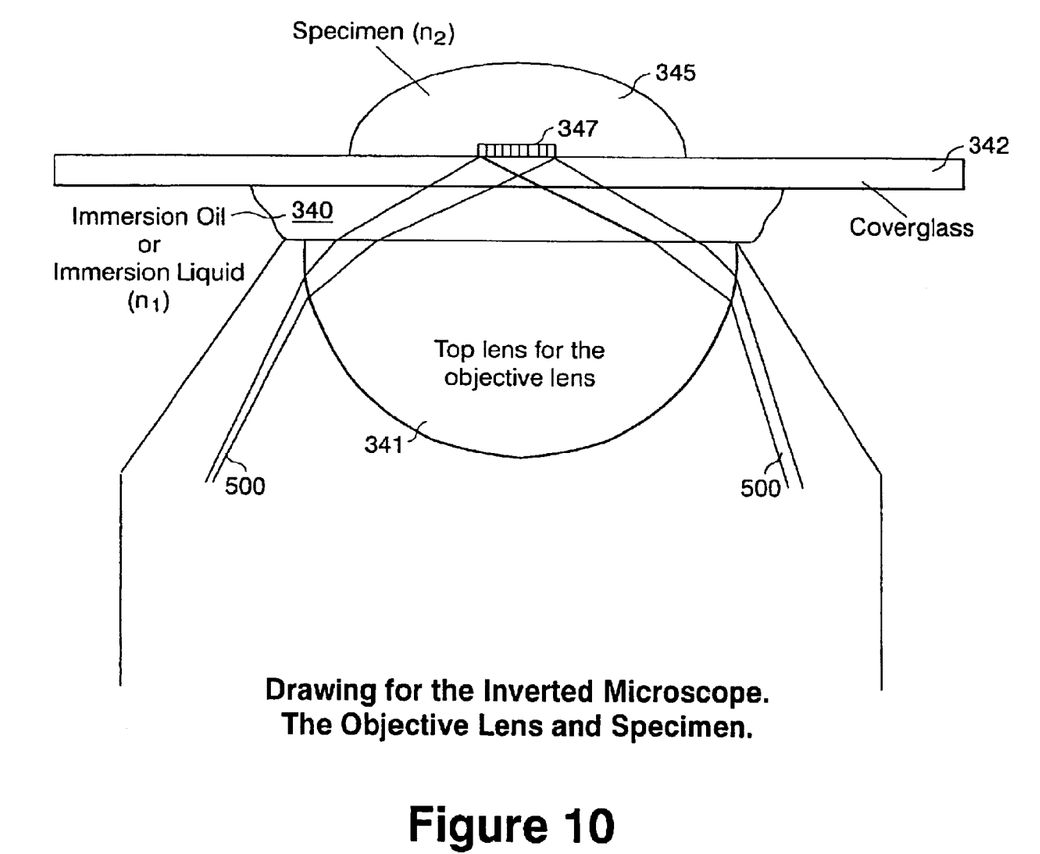
FIG. 10 illustrates the objective lens and specimen of the microscope of FIG. 9.

Referring now to FIG. 10, therein is shown the objective lens and specimen for an inverted microscope. The top lens 341 of the objective lens 314 is adjacent immersion liquid 340, preferably an immersion oil having a refractive index n1. A specimen 345 having a refractive index n2 is placed on a cover glass 342. Light 500 comes from the illuminator and is incident on and passes through the immersion liquid 340. The light reflects from the cover glass 342. This refractive index of the cover glass 324 is preferably almost the same as the refractive index of the immersion liquid 340. An evanescent wave 347 is produced from surface of the cover glass 342. The specimen molecules 345 that are very close to the cover glass 342 therefore achieve fluorescence. The emission light from the fluorescence goes through the dichromatic filter 312 and emission filter 320 and is focused on the imaging device 318.

The microscopes of the present invention preferably have an objective lens having a numerical aperture NA(OB) following the conditions:

$$\_1=\sin^{-1}(n2/n1)$$

$$3>NA(OB)>n1 \sin \_1$$

Where NA(OB) is a numerical aperture of the objective lens, n1 is the refractive index of an immersion oil for the objective lens, and n2 is the refractive index for the specimen or the medium for the specimen.

If the objective lens' numerical aperture NA(OB) is less than "n1 sin $\_1$", the illumination light can not make totally reflected illumination. The difficulty for the TIRFM setup is that light should pass through the very perimeter of the objective's pupil. If the objective lens' numerical aperture meets this condition TIRFM can be observed:

$$3>NA(OB)>1.4$$

If more margin is had for the objective lens numerical aperture, the alignment for the annulus in the illuminator becomes easier:

$$3>NA(OB)>1.42$$

If more brightness is needed, the following condition can help:

$$3>NA(OB)>1.45$$

However, if the NA(OB) is more than 3, the objective lens is very difficult to design because the glass refractive index is limited.

The microscopes of the present invention preferably have an illuminator having a conjugate plain for the objective lens pupil position and an illumination lens which meets the following conditions:

$$\_1=\sin^{-1}(n2/n1)$$

$$NA(OB)>n1 \sin \_1$$

$$1.27<2\times NA(OB)\times f(OB)/B(IL)<75$$

Where, NA(OB) is a numerical aperture of the objective lens, n1 is the refractive index of an immersion oil for the objective lens, n2 is the refractive index for the specimen or the medium for the specimen, f(OB) is a focal length for the objective lens, and B(IL) is a magnification by the illumination lens that is from "the pupil of the objective lens" to "the conjugate position into the illuminator".

Example: a magnification by the illumination lens that is from the pupil of the objective lens 330 to the conjugate position into the illuminator 324 is B(IL).

The objective lens focal length is as follows;

$$1.0<f(OB)<6$$

If the objective lens focal length is in this area, the lens design is possible. If the objective lens focal length is out of this area, it is very difficult to design the objective lens for TIRFM.

$$0.3<B(TL)<2.5$$

If the magnification of the illumination lens is in this area, the microscope is easy to construct. If the magnification is more than 2.5×, it is very difficult to construct a reasonable size illuminator, i.e., the illuminator becomes longer. If the magnification is less than 0.3, the illuminator is very difficult to design the illuminator lens.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A microscope for use in total internal reflection fluorescence microscopy (TIRFM), the microscope comprising:
   a first white-light source for directing light along a first optical path;
   an annular slit member disposed in the first optical path, the annular slit member having an annular slit for blocking all but an annulus of light corresponding to the annular slit; and
   an objective lens for directing the annulus of light to a specimen such that TIRFM of the specimen is achieved,
   wherein a numerical aperture of the objective lens follows the conditions:

$\theta 1 = \sin^{-1}(n2/n1)$ $3 > NA(OB) > n1 \sin\theta 1$ where NA(OB) is the numerical aperture of the objective lens, n1 is the refractive index of an immersion oil for the objective lens, and n2 is the refractive index for the specimen or a medium for the specimen; and
   wherein the microscope further comprising converting means for converting the microscope to and from a conventional microscope.

2. A microscope for use in total internal reflection fluorescence microscopy (TIREM), the microscope comprising:
   a first white-light source for directing light along a first optical path;
   an annular slit member disposed in the first optical path, the annular slit member having an annular slit for blocking all but an annulus of light corresponding to the annular slit; and
   an objective lens for directing the annulus of light to a specimen such that TIRFM of the specimen is achieved,
   wherein a numerical aperture of the objective lens follows the conditions:

$\theta 1 = \sin^{-1}(n2/n1)$ $3 > NA(OB) > n1 \sin\theta 1$ where NA(OB) is the numerical aperture of the objective lens, n 1 is the refractive index of an immersion oil for the objective lens, and n2 is the refractive index for the specimen or a medium for the specimen; and
   wherein the microscope further comprising changing means for changing the observation condition from the TIRFM observation into a non-TIREM observation and vice versa.

3. A microscope for use in total internal reflection fluorescence microscopy (TIRFM), the microscope comprising:
   a first white-light source for directing light along a first optical path;
   an annular slit member disposed in the first optical path, the annular slit member having an annular slit for blocking all but an annulus of light corresponding to the annular slit; and
   an objective lens for directing the annulus of light to a specimen such that TIRFM of the specimen is achieved;
   wherein a numerical aperture of the objective lens follows the conditions:

$\theta 1 = \sin^{-1}(n2/n1)$ $3 > NA(OB) > n1 \sin\theta 1$ where NA(OB) is the numerical aperture of the objective lens, n1 is the refractive index of an immersion oil for the objective lens, and n2 is the refractive index for the specimen or a medium for the specimen; and
   wherein the annular slit member is movable into and out from the first optical path.

4. The microscope of claim 3, further comprising a mechanism upon which the annular slit member is disposed for moving the annular slit member into and out from the first optical path.

5. The microscope of claim 4, wherein the mechanism is a slide mechanism for sliding the annular slit member into and out from the first optical path.

6. A microscope for use in total internal reflection fluorescence microscopy (TIRFM), the microscope comprising:
   a first white-light source for directing light along a first optical path;
   an annular slit member disposed in the first optical path, the annular slit member having an annular slit for blocking all but an annulus of light corresponding to the annular slit; and
   an objective lens for directing the annulus of light to a specimen such that TLRFM of the specimen is achieved;
   wherein an illuminator has a conjugate plane for the objective lens pupil position and an illumination lens has the conditions:

$\theta 1 = \sin^{-1}(n2/n1)$ $3 > NA(OB) > n1 \sin\theta 1$ $2.82 < 2 \times NA(OB) \times f(OB) \times B(IL) < 60$ where NA(OB) is the numerical aperture of the objective lens, n1 is the refractive index of an immersion oil for the objective lens, n2 is the refractive index for the specimen or a medium for the specimen, f(OB) is a focal length for the objective lens, and B(IL) is a magnification by the illumination lens that is from the pupil of the objective lens to the conjugate position into the illuminator; and
   wherein the microscope further comprising converting means for converting the microscope to and from a conventional microscope.

7. A microscope for use in total internal reflection fluorescence microscopy (TIRFM), the microscope comprising:
   a first white-light source for directing light along a first optical path;
   an annular slit member disposed in the first optical path, the annular slit member having an annular slit for blocking all but an annulus of light corresponding to the annular slit; and an objective lens for directing the annulus of light to a specimen such as TLRFM of the specimen is achieved, wherein an illuminator has a conjugate plane for the objective lens pupil position and an illumination lens has the conditions:

$$\theta 1 = \sin^{-1}(n2/n1)$$

$$3 > NA(OB) > n1 \sin\theta 1$$

$$2.82 > 2 \times NA(OB) \times f(OB) \times B(IL) < 60$$

where NA(OB) is the numerical aperture of the objective lens, n1 is the refractive index of an immersion oil for the objective lens, n2 is the refractive index for the specimen or a medium for the specimen, f(OB) is a focal length for the objective lens, and B(IL) is a magnification by the illumination lens that is from the pupil of the objective lens to the conjugate position into the illuminator; and by the illumination lens that is from the pupil of the objective lens to the conjugate position into the illuminator; and wherein the microscope further comprising changing means for changing the observation condition from the TIRFM observation into a non-TIRFM observation and vice versa.

8. A microscope for use in total internal reflection fluorescence microscopy (TIRFM), the microscope comprising:

a first white-light source for directing light along a first optical path;

an annular slit member disposed in the first optical path, the annular slit member having an annular slit for blocking all but an annulus of light corresponding to the annular slit; and an objective lens for directing the annulus of light to a specimen such that TIRFM of the specimen is achieved, wherein an illuminator has a conjugate plane for the objective lens pupil position and an illumination lens has the conditions:

$$\theta 1 = \sin^{-1}(n2/n1)$$

$$3 > NA(OB) > n1 \sin\theta 1$$

$$2.82 < 2 \times NA(OB) \times f(OB) \times B(IL) < 60$$

where NA(OB) is the numerical aperture of the objective lens, n1 is the refractive index of an immersion oil for the objective lens, n2 is the refractive index for the specimen or a medium for the specimen, f(OB) is a focal length for the objective lens, and B(IL) is a magnification by the illumination lens that is from the pupil of the objective lens to the conjugate position into the illuminator; and wherein the annular slit member is movable into and out from the first optical path.

9. The microscope of claim 8, further comprising a mechanism upon which the annular slit member is disposed for moving the annular slit member into and out from the first optical path.

10. The microscope of claim 9, wherein the mechanism is a slide mechanism for sliding the annular slit member into and out from the first optical path.

* * * * *